2,477,068

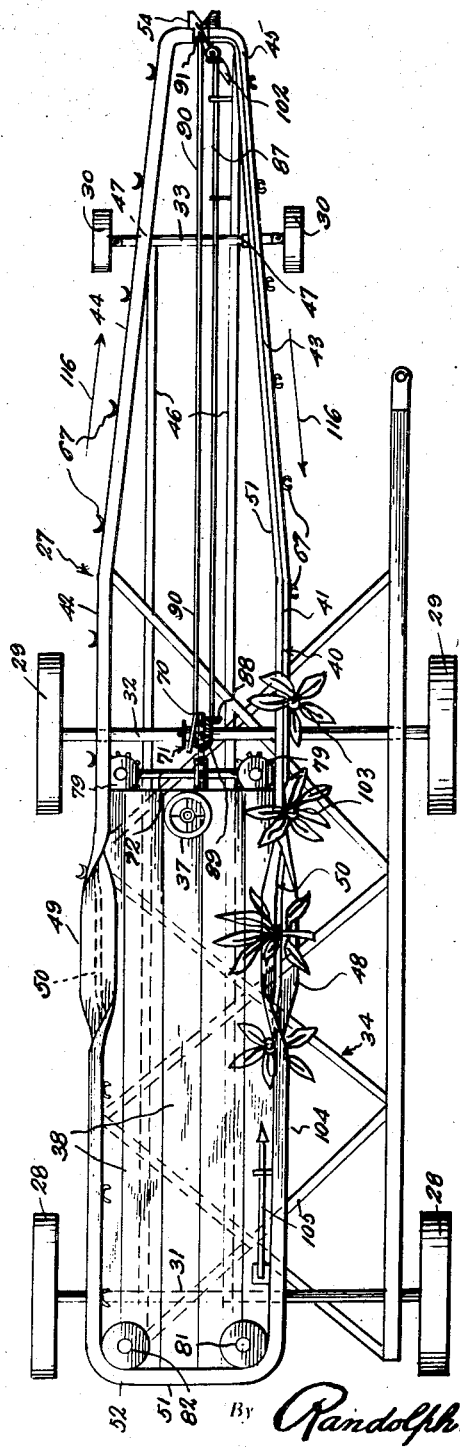

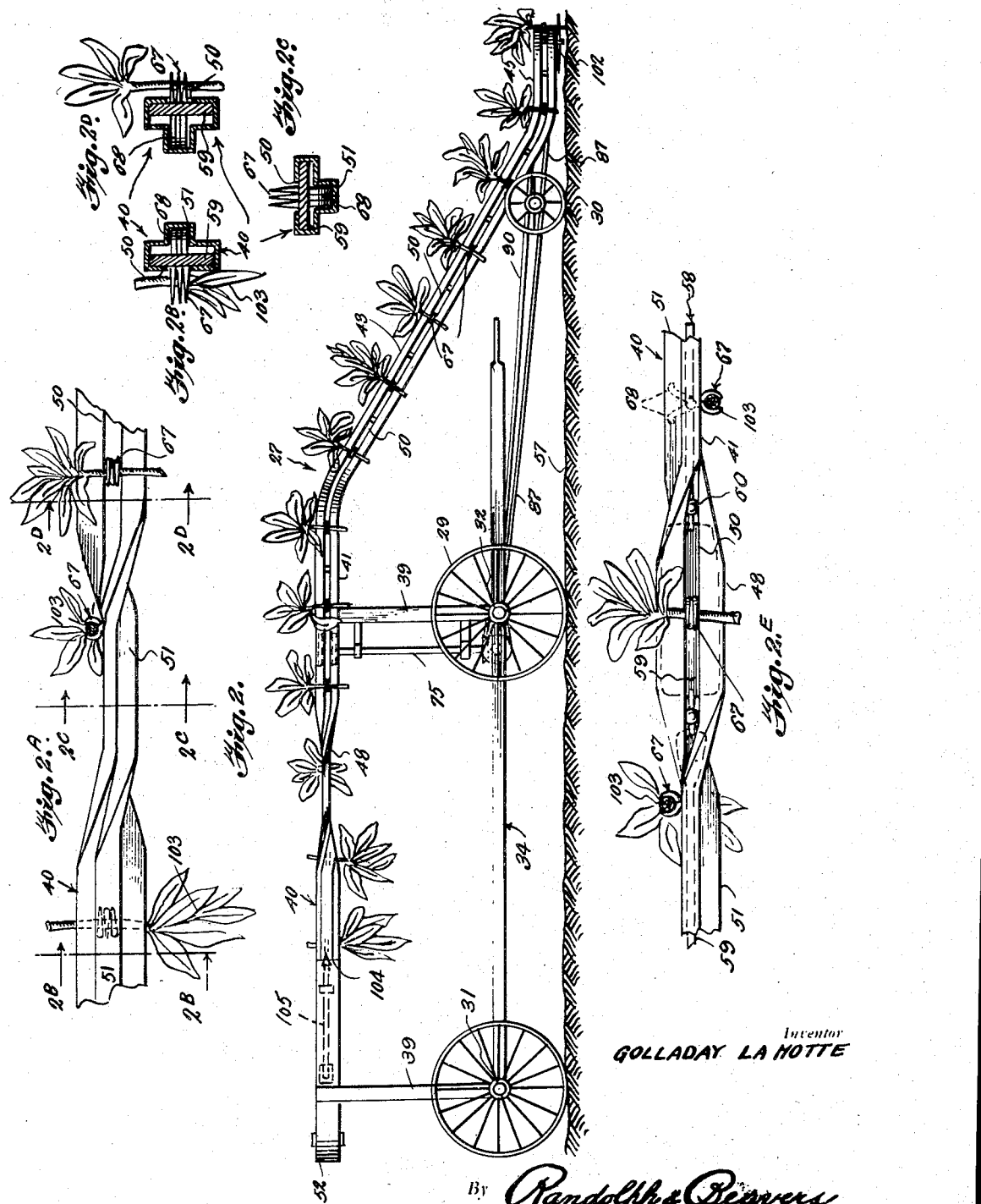

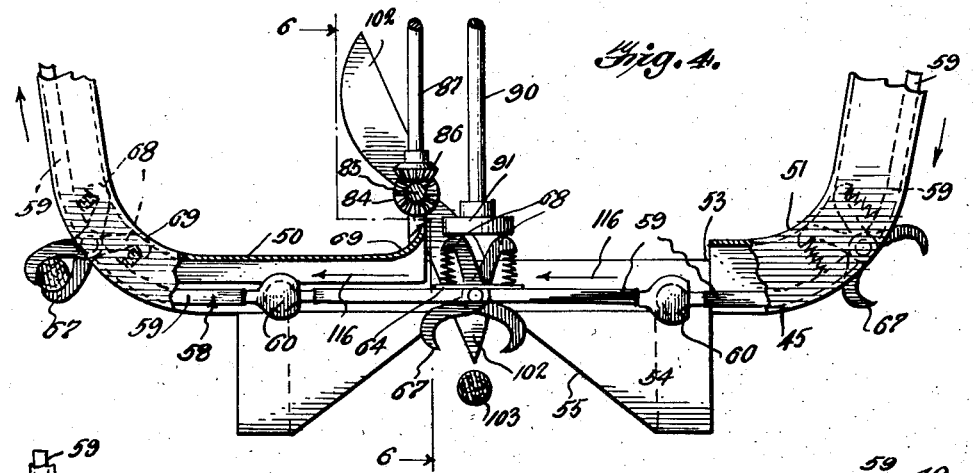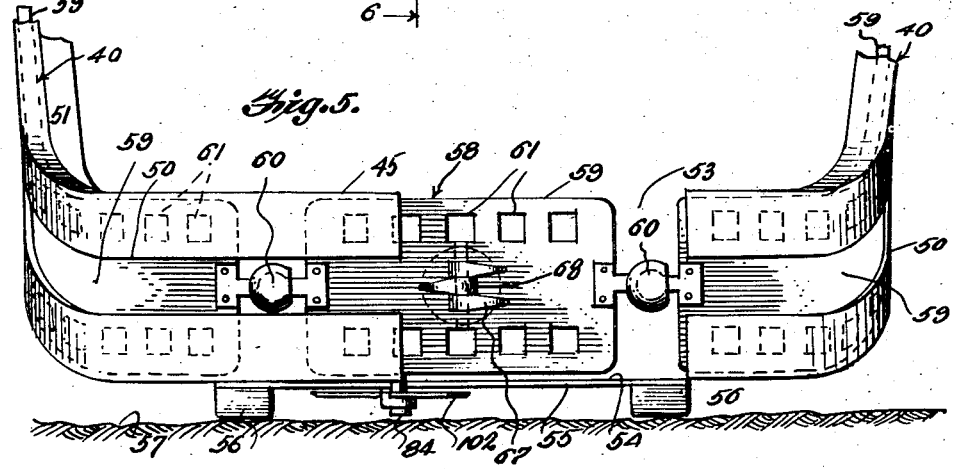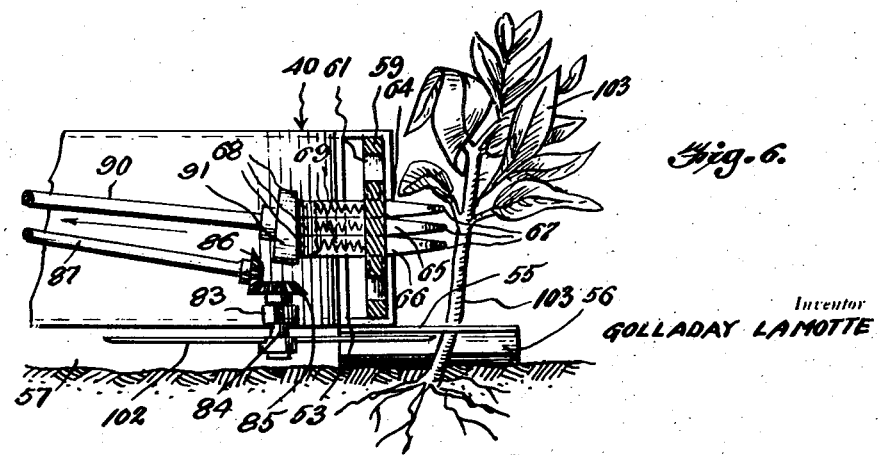

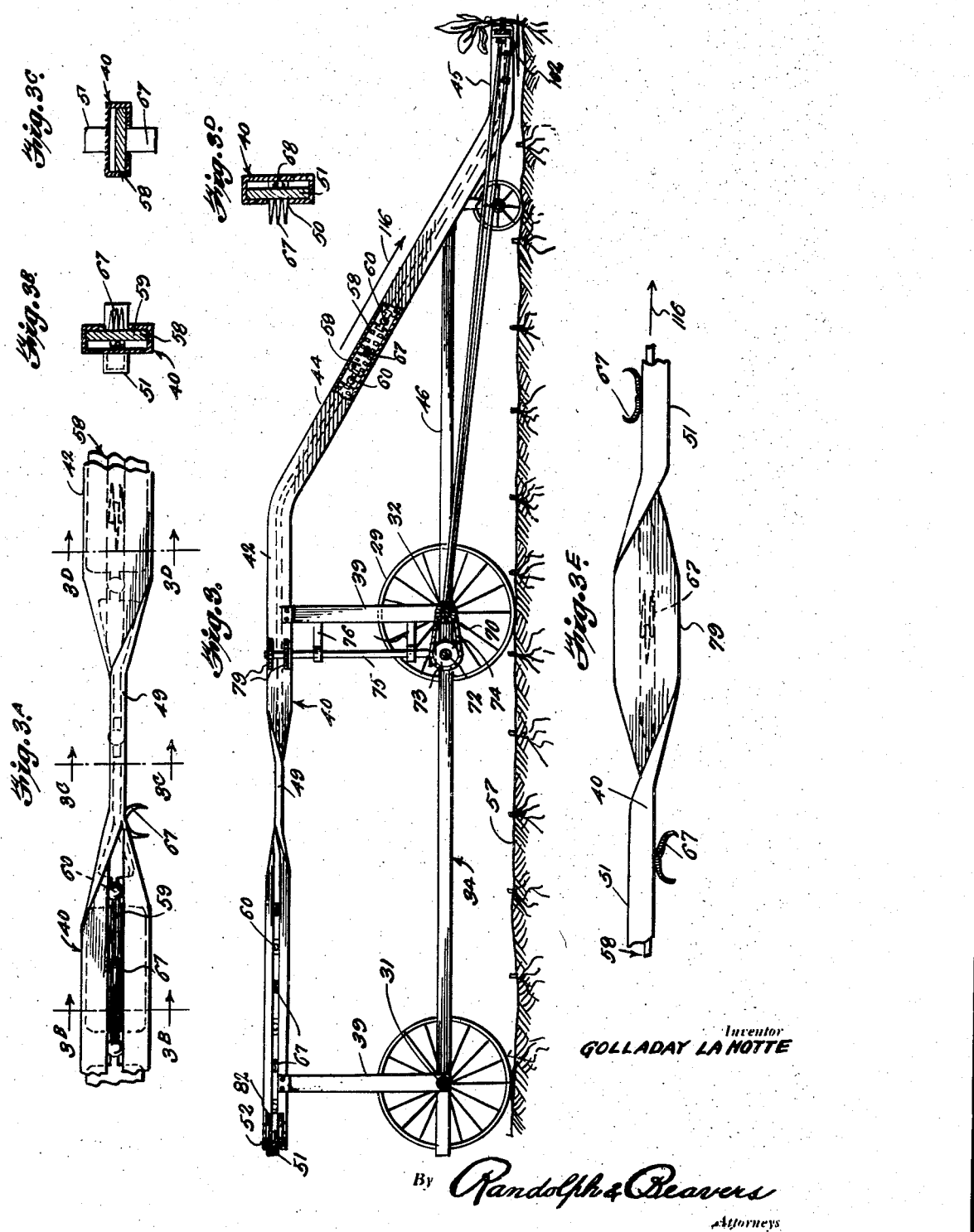

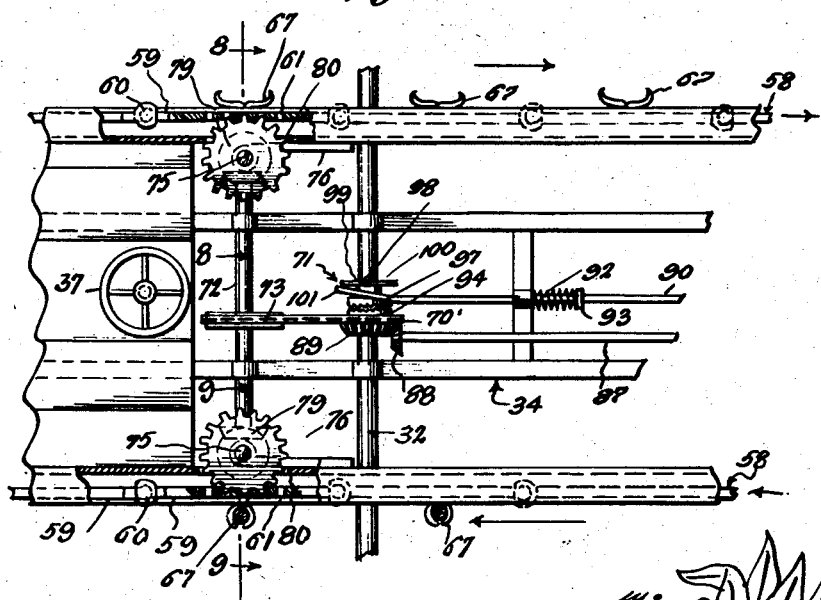
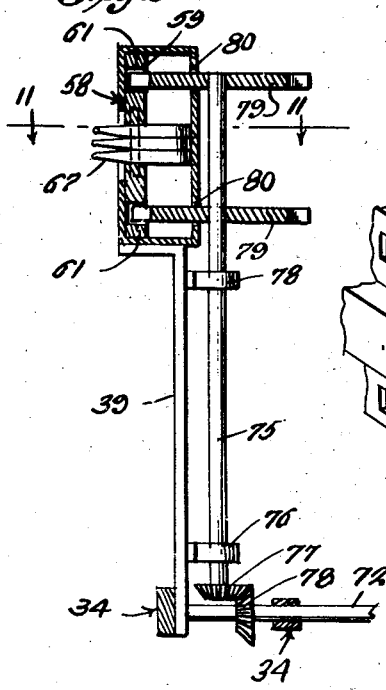
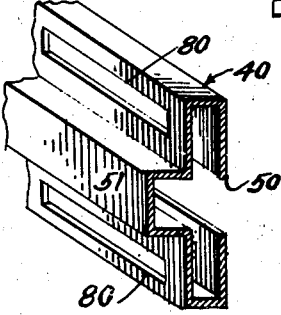

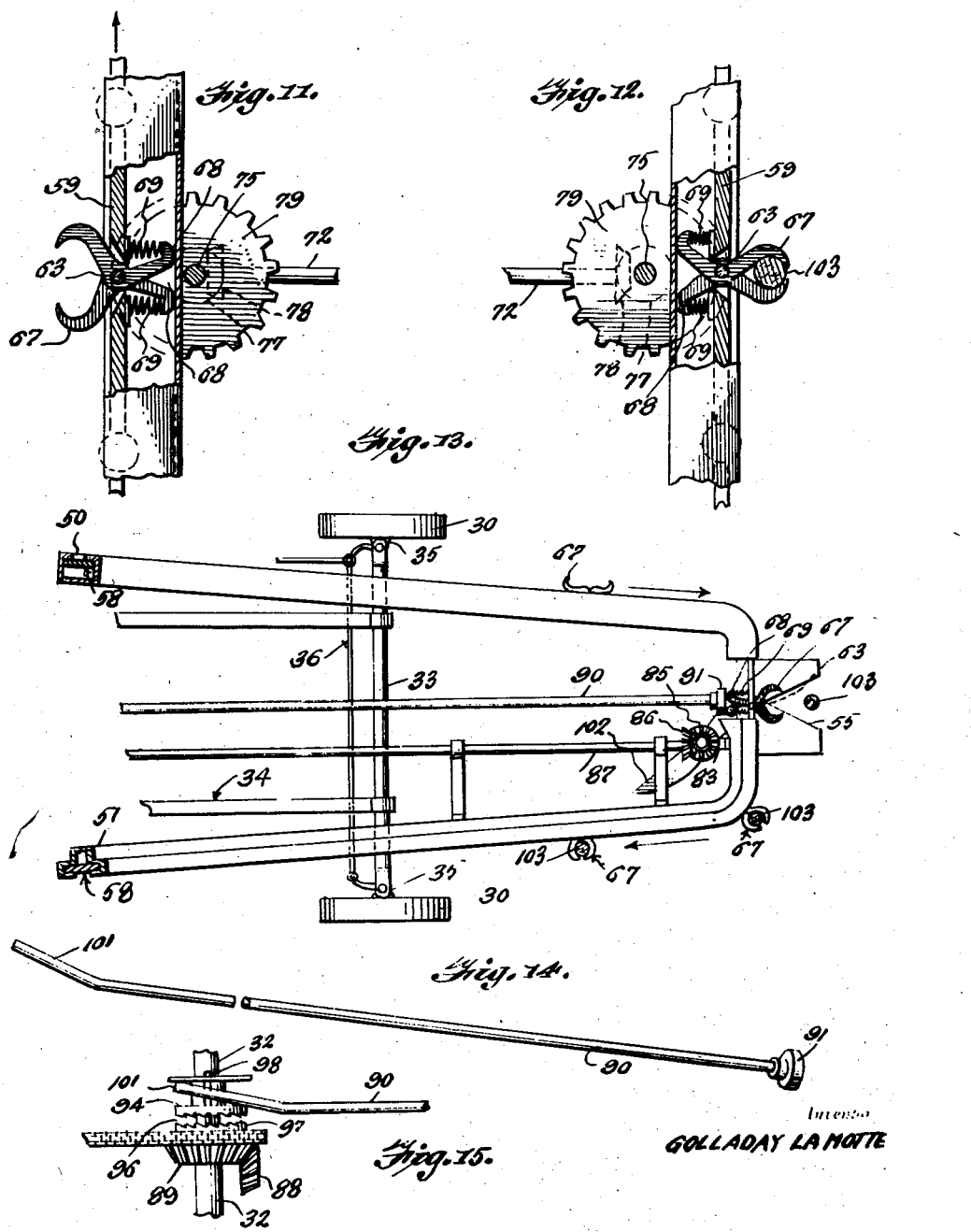

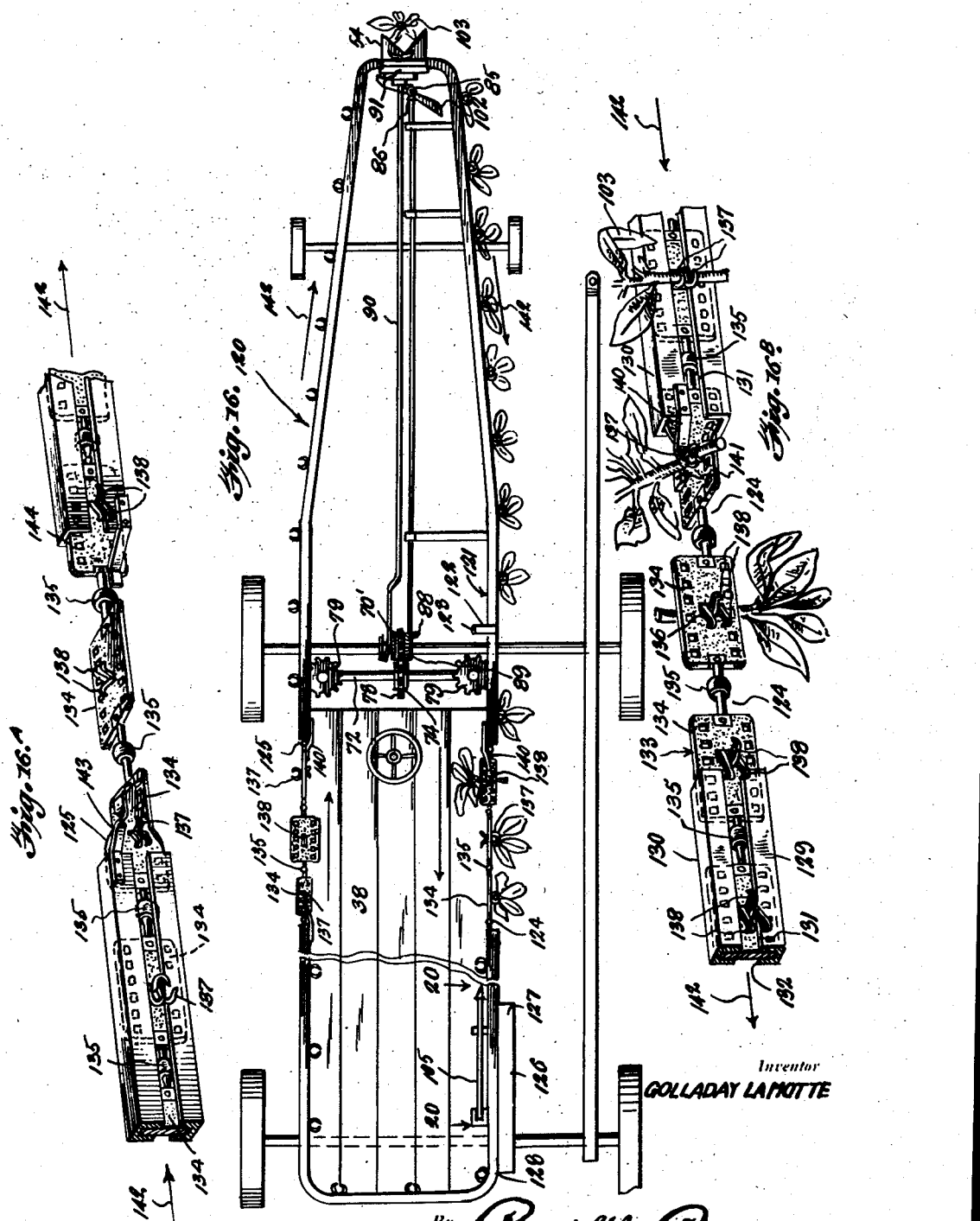

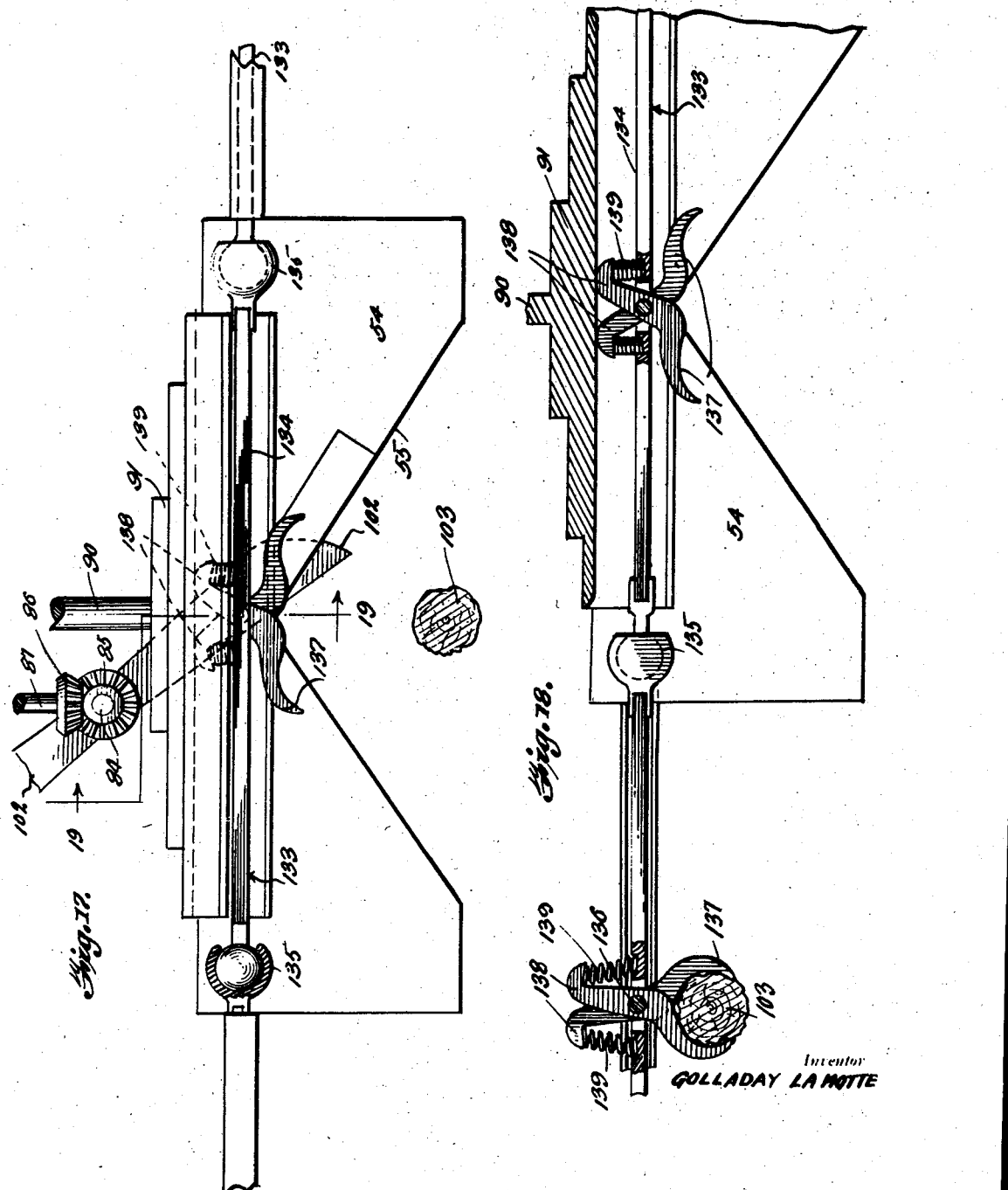

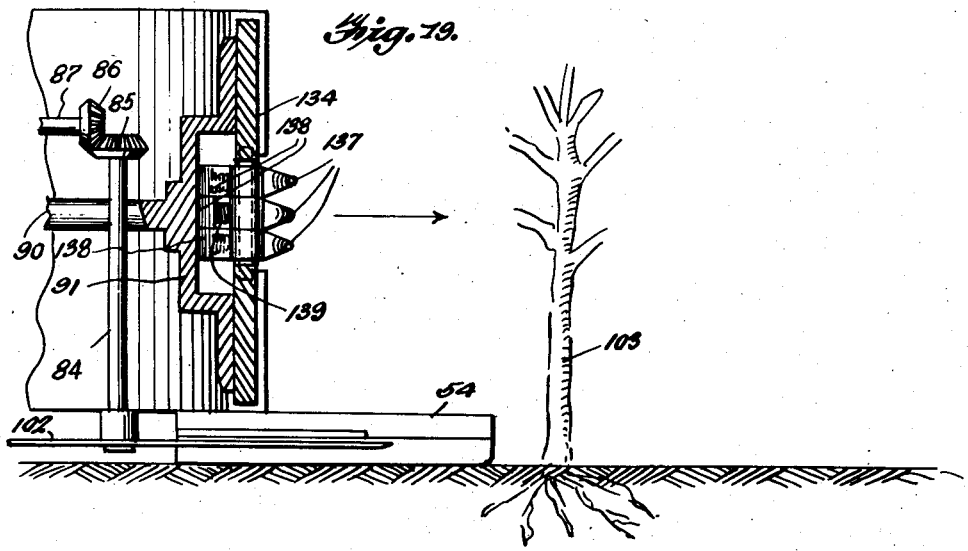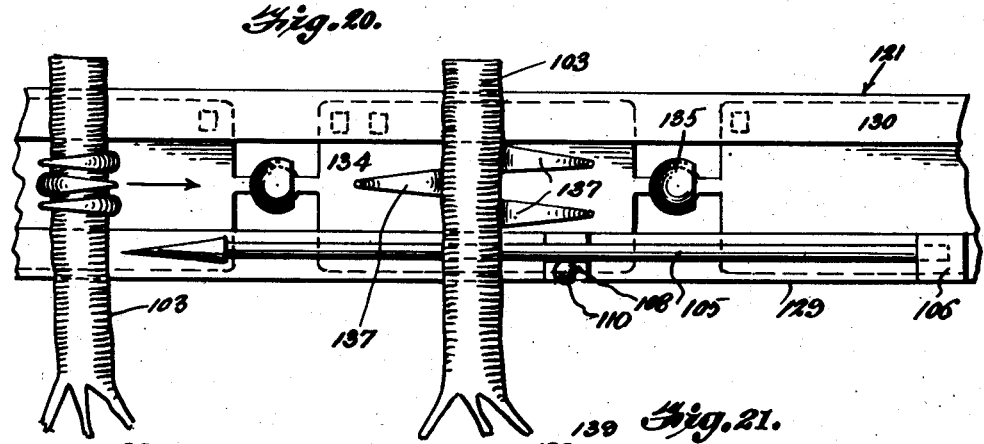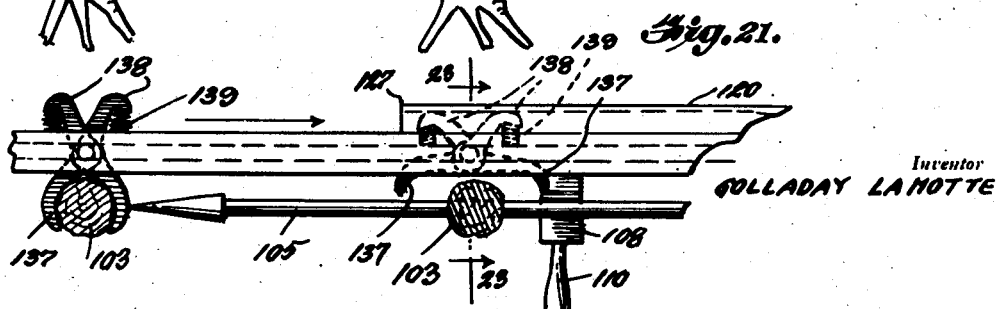

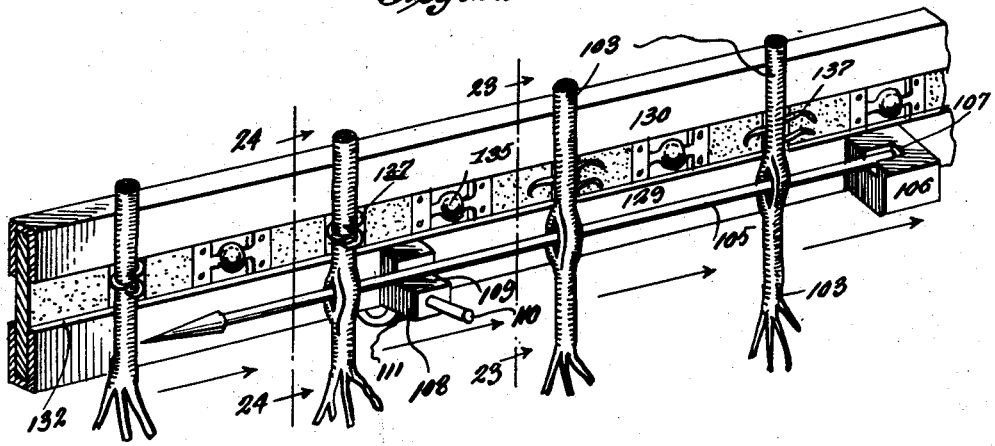
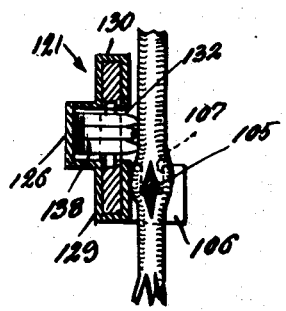 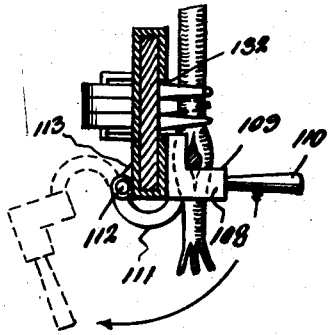 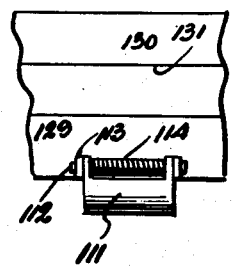
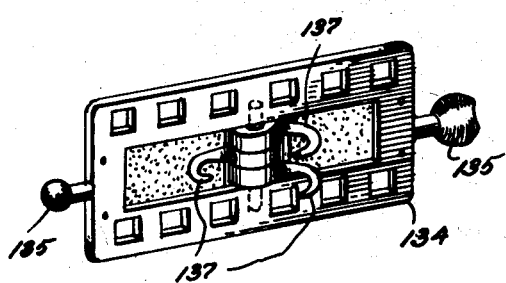
Inventor
GOLLADAY LA MOTTE
By Randolph & Beavers
Attorneys Patented July 26, 1949

UNITED STATES PATENT OFFICE 2,477,068

HARVESTER WITH INTERMITTENTLY DRIVEN PLANT CUTTER AND CONVEYER

Golladay La Motte, Hopkinsville, Ky.

Application April 22, 1946, Serial No. 663,863

6 Claims. (Cl. 56—27.5)

1

This invention relates to a machine for harvesting plant-type crops and is especially intended and adapted for use in the harvesting of tobacco plants.

It is a primary object of the present invention to provide a machine which may either be self propelled or operated as a trailer attached to a tractor or other agricultural machine and which is adapted to be moved through a field of plant crops to be harvested and along a plant row for cutting off the individual plants, adjacent their roots and just above the ground, and for conveying the plants and applying them onto tobacco sticks.

A further object of the invention is to provide a harvesting machine having means for grasping the individual plants, for thereafter cutting the plants, and for subsequently conveying the plants away from the cutter means to enable the next plant still standing in the row being harvested, to be engaged and cut.

Still a further aim of the invention is to provide a machine which will be operated intermittently for cutting and conveying and having means whereby engagement of the plants, to be harvested, with the machine will actuate the operating means.

Still a further aim of the invention is to provide a machine having endless conveyor means by which the individual plants are inverted from the positions in which they are originally engaged and applied to plant supporting sticks, while thus inverted.

Still a further aim of the invention is to provide a conveyor having plant engaging means for grasping and releasing the harvested plants automatically.

Other objects and advantages of the invention will hereinafter become more fully apparent by the following description of the drawings, which illustrate a preferred embodiment thereof, and wherein:

Figure 1 is a top plan view of one form of the harvesting machine;

Figure 2 is a side elevational view thereof;

Figure 2<sup>A</sup> is an enlarged fragmentary, side elevational view of a portion of the conveyor;

Figures 2<sup>B</sup>, 2<sup>C</sup> and 2<sup>D</sup> are cross sectional views taken substantially along the plane of the lines 2<sup>B</sup>—2<sup>B</sup>, 2<sup>C</sup>—2<sup>C</sup>, and 2<sup>D</sup>—2<sup>D</sup> of Figure 2<sup>A</sup>;

Figure 2<sup>E</sup> is a top plan view of a portion of the conveyor;

Figure 3 is a longitudinal, substantially central sectional view of the machine;

Figure 3<sup>A</sup> is an enlarged fragmentary side elevational view of a part of the conveyor portion shown in Figure 3;

Figures 3<sup>B</sup>, 3<sup>C</sup> and 3<sup>D</sup> are cross sectional views taken substantially along the plane of the lines 3<sup>B</sup>—3<sup>B</sup>, 3<sup>C</sup>—3<sup>C</sup> and 3<sup>D</sup>—3<sup>D</sup> of Figure 3<sup>A</sup>;

Figure 3<sup>E</sup> is a top plan view of the portion of the conveyor shown in Figure 3<sup>A</sup>;

Figure 4 is an enlarged top plan view, partly in horizontal section, showing the forward end of the machine;

Figure 5 is a front elevational view thereof;

Figure 6 is a longitudinal sectional view taken substantially along the plane of the line 6—6 of Figure 4;

Figure 7 is a top plan view, partly in horizontal section, of a part of the intermediate portion of the machine;

Figures 8 and 9 are enlarged cross sectional views taken substantially along the planes of the lines 8—8 and 9—9, respectively, of Figure 7;

Figure 10 is a perspective view of a portion of the conveyor guide;

Figure 11 is a horizontal sectional view, partly in top plan, taken substantially along a plane as indicated by the line 11—11 of Figure 8;

Figure 12 is a view similar to Figure 11, taken substantially along the plane of the line 12—12 of Figure 9;

Figure 13 is a top plan view of the forward portion of the machine;

Figure 14 is a perspective view of a push rod;

Figure 15 is a plan view, on an enlarged scale, of the clutch;

Figure 16 is a top plan view of another embodiment of the machine;

Figure 16<sup>A</sup> is an enlarged perspective view of a part of the return side of the conveyor;

Figure 16<sup>B</sup> is a similar view of a part of the opposite side thereof;

Figure 17 is an enlarged plan view, partly in horizontal section, of the forward end of the machine;

Figure 18 is a view similar to Figure 17, showing additional parts in horizontal section;

Figure 19 is a vertical sectional view taken substantially along a plane as indicated by the line 19—19 of Figure 17;

Figure 20 is an enlarged side elevational view taken substantially along a plane as indicated by the line 20—20 of Figure 16;

Figure 21 is a fragmentary top plan view of certain of the parts shown in Figure 20;

Figure 22 is a perspective of the structure shown in Figure 20;

Figures 23 and 24 are cross sectional views taken substantially along planes as indicated by the lines 23—23 and 24—24 of Figure 22;

Figure 25 is a fragmentary side elevational view, looking in the opposite direction to Figure 20; and Figure 26 is a perspective view of one section of the endless conveyor.

Referring more particularly to the drawings and particularly to Figures 1 to 15, inclusive, and to Figures 20 to 25 inclusive, wherein one embodiment of the plant harvesting machine designated generally 27 is illustrated, said machine is preferably supported for movement through a field by three sets of ground engaging wheels 28, 29 and 30. Each of the sets of wheels includes a pair of wheels supported on the ends of an axle, said axles being designated 31, 32 and 33, respectively. The axles are mounted on the frame 34 of the machine 27; the rear axle 31 being either fixed or journaled therein, the intermediate axle 32 being journaled therein and with its wheels 29 keyed to the ends thereof, and the front axle 33 being fixed thereto and with its wheels 30 rotatably mounted on the ends thereof.

As best illustrated in Figures 1 and 13, the front axle 33 is provided with stub-axles 35, at the ends thereof, on which the wheels 30 are journaled. A conventional vehicle steering mechanism 36 is connected to the stub-axles 35 and to the steering post of a steering wheel 37, as seen in Figure 1. The frame 34 is provided with a floor or platform 38 for supporting an operator, not shown, who stands thereon in a position to steer the machine 27 by means of the steering wheel 37.

As best seen in Figures 2 and 3, the frame 34 is provided with a plurality of supporting uprights or posts 39 which support the intermediate and rear portion of an endless conveyor guide, designated generally 40. The conveyor guide 40 extends from end to end of the machine 27 and has corresponding side portions which converge toward the forward end thereof, as best seen in Figure 1. Said corresponding side portions, designated 41 and 42 are downwardly and forwardly inclined adjacent their forward ends, as seen at 43 and 44, respectively, as best illustrated in Figures 2 and 3, to position the forward end 45 of the conveyor guide 40 in downwardly off-set relationship to the rear end thereof. The forward part of the conveyor guide 40 is supported by longitudinal beams 46, forming a part of the frame 34 and also by posts 47 which are secured to the front axle 33.

As best illustrated in Figures 2, 2^A and 2^E, the conveyor guide portion 41, between the front and rear uprights 39, is provided with a gradual 180 degree twist portion 48; and as seen in Figures 3, 3^A and 3^E, the guide portion 42 is provided with a similarly located and similarly twisted portion 49, for a purpose which will hereinafter be described.

Referring to Figures 2, 2^A and 2^E, it will be readily apparent that the guide portion 41 constitutes a substantially closed conduit, as seen in Figures 2^E, 2^C and 2^D, except for a longitudinally extending slot 15 in one side thereof. The opposite side of the conduit forming the guide 40 is provided with a continuous, longitudinally disposed and inwardly opening channel 51. From the forward end 45 of the guide to the beginning of the twisted portion 48, the guide portions 41 and 43 are disposed with the slot 50 thereof, arranged to open laterally and outwardly of the machine 27, and the channel 51 is disposed on the inner side thereof. Beyond the twisted portion 48, across the rear guide portion 52 and back to the twisted portion 49 on the opposite side, the slot 50 is arranged to open inwardly. As seen in Figures 3 and 3^A the twist 49 in the side 42 of the guide again turns said guide so that therebeyond and to the forward end of the machine 27, the conveyor guide 40 is located with the slot 50 facing outwardly.

Particularly in Figures 4 and 5, the forward portion 45 of the conveyor guide is provided with a gap 53 between spaced portions of the guide conduit which are bridged or connected by a horizontally disposed plate 54 which is located adjacent to the ground level and beneath and against the underside of the guide portion 45. The plate 54 is provided with a forwardly opening, substantially V-shaped recess or notch 55 for a purpose which will hereinafter become apparent. A pair of longitudinally disposed skids or runners 56 depend from the plate 54, adjacent the ends thereof, and are arranged to support the forward end 45 by engagement with the ground, indicated by the numeral 57 in Figure 5, in the event that the machine 27 is tilted downwardly at its front end or in passing over raised portions in the surface of the ground.

As illustrated in Figures 4, 5 and 6, the conveyor guide 40 contains an endless conveyor, designated generally 58 and which is composed of a plurality of flexible plates or strips 59 which are connected together in spaced apart, end to end relationship by universal ball and socket joints 60. As best seen in Figure 6, the plates 59 are of a width slightly less than that of the conveyor guide 40 and of a thickness substantially less than that of the guide to permit individual plates 59, forming the endless conveyor 58, to slide freely in the several portions of the conveyor guide 40.

Each of the plates 59 is provided with a series of longitudinally disposed, longitudinally spaced openings 61 adjacent each longitudinal edge thereof and with a central opening 62 through which a pivot pin 63 extends. Each of the plates 59 is so equipped with a pivot pin 63, arranged transversely thereof, and each pivot pin 63 provides a pivotal support for three fingers 64, 65 and 66 which are arranged in superimposed relationship. Said fingers are pivotally connected intermediate of their ends and are provided with outwardly projecting claw portions 67 which are bowed longitudinally. The claw portions 67 of the top and bottom fingers 64 and 66 project in one direction and the claw of the intermediate finger 65 projects in the opposite direction. The opposite ends or lever portions 68 of the fingers 64, 65 and 66 are curved so as to extend in the same general direction as the complementary claws 67, so that said fingers actually do not cross but merely overlap for a portion of their length. An expansion coil spring 69 is disposed between the outer end of each lever 68 and the rear face of the complementary plate 59 for urging the lever portions 68 to swing toward one another, thereby urging the claws 67 toward one another and into closed relationship, as best illustrated in Figure 12. From the foregoing it will thus be readily apparent that the spring 69 urges the lever end 68 away from the plates 59 thereby urging the claws 67 to closed position.

Referring particularly to Figures 7 and 8, the shaft or axle 32 which is keyed to the ground wheels 29 and journaled in the frame 34 has a sprocket wheel 70 rotatably mounted thereon. A clutch, designated generally 71, which will hereinafter be described in detail, is splined on shaft 32, and is movable into and out of engagement with the sprocket wheel 70 to cause the sprocket wheel 70 to be rotated by the axle 32 or to permit the axle 32 to revolve relatively to the sprocket wheel. A transversely disposed shaft 72 is journaled in the frame 34 behind the axle 32 and has a sprocket wheel 73 keyed thereto. An endless chain 74 is trained over the sprocket wheels 70 and 73 for driving the shaft 72 from the axle 32 when the clutch 71 is in an operative position. A pair of vertically disposed shafts 75 are journaled in bearings 76 which are secured to and project upwardly from the forward pair of supporting posts 39. The shafts 75 have bevel gears 77 keyed to their lower ends and the shaft 72 has two bevel gears 78 keyed thereto, one of which meshes with each of the bevel gears 77 for driving the shafts 75 from the shaft 72. Each of the shafts 75 is provided with a pair of sprocket wheels 79 which are keyed thereto and disposed adjacent the upper end thereof and in vertically spaced apart relationship. The sprocket wheels 79 project through slots 80 in the inner wall of the conveyor guide 40 into the interior thereof, and the teeth of said sprocket wheels 79 are arranged to engage in the rows of openings 61 of the plates 59 so that said openings and the plates will function as an endless belt which is driven by the sprocket wheels 79.

As best seen in Figure 1, a pair of vertically disposed shafts 81 are journaled in the frame 34, adjacent the rear corners thereof, and are each provided with a pair of sprocket wheels 82 keyed thereto in the same manner as the sprocket wheels 79 are keyed to the shafts 75. The sprocket wheels 82 are preferably idler sprocket wheels and function to assist the plates 59 in passing around the rear corners of the conveyor guide 40; however, sprocket wheels 82 may, if desired, be driven through a suitable connection with the shafts 75.

Referring particularly to Figures 4, 6 and 13, a bearing 83 projects rearwardly from the forward, transverse portion 45 of the conveyor guide to provide a journal for a vertically disposed shaft 84 which has a bevel gear 85 keyed to the upper end thereof and meshing with a bevel gear 86 which is keyed to the forward end of a longitudinally disposed shaft 87. The shaft 87 is journaled in transversely disposed members forming a part of the frame 34 and is provided at its rear end with a bevel gear 88, as best seen in Figure 1, which meshes with a bevel gear 89 which is secured to or forms a part of the sprocket 70.

A push rod 90 is reciprocally mounted by the frame 34 for longitudinal movement relatively thereto and is provided at its forward end with a head or plate 91 which is normally disposed to engage the lever ends 68 of the fingers which are located intermediate of the ends of the plate 54. As seen in Figure 7, an expansion spring 92 is carried by the rod 90 and has one end thereof seated against a transverse bar of the frame 34, in which the rod 90 is reciprocally disposed. The opposite end of the spring 92 abuts against a collar 93 carried by the rod 90 for urging said rod forwardly to move the head 91 into engagement with the lever end 68, previously referred to.

Referring particularly to Figure 15, the clutch 71 includes a clutch disk 94 having a toothed face 95 for interengagement with the similarly shaped toothed face 96 on a clutch member 97 which is fixed to the sprocket wheel 70 on the opposite side thereof to the bevel gear 89. The axle 32 is provided with an elongated slot 98 in which a key 99 is slidably disposed. The key 99 is connected at one end thereof to the clutch disk 94 and is connected at its opposite end to a disk or plate 100. The key 99 functions to key the disk 94 and plate 100 to the axle 32 and to connect the parts 94 and 100 in spaced apart relationship. The push rod 90 is provided with an oblique portion 101 at its rear end which projects through the space between the parts 94 and 100. When the push rod 90 is moved forwardly by the spring 92, the oblique end 101 acts as a cam for engagement with the plate 100 for moving the clutch disk 94 out of engagement with the clutch member 97. When the push rod 90 is moved rearwardly the oblique portion 101 is disengaged from the plate 100 and immediately thereafter the opposite side of the oblique portion 101 moves into engagement with the disk 94 to return said disk into operative engagement with the clutch member 97, by means which will hereinafter be described.

As best illustrated in Figure 6, a rotary cutting knife 102 is provided with a hub portion which is keyed to the lower end of the shaft 84. Knife 102 is provided with two or more radially projecting cutting blades which are disposed to operate just below the plate 54 for cutting off growing plants, indicated 103 near their roots and just above the ground level 57.

As seen in Figure 1, from in front of the shaft 84 along the conveyor guide portions 43 and 41, the channel 51 is relatively shallow to just beyond the twist 48 therein where, at the point 104 the channel is increased in depth and is of this increased depth back to the gap 53 in the forward portion 45.

Contiguous with the beginning of the increased depth of the channel 51 at 104, the guide 40 is provided with a stick 105 upon which the plants 103 are collected, as will hereinafter be explained. The stick 105 and its method of mounting is fully illustrated in Figures 20 to 25, wherein a modified form of the machine is shown, but in which the construction of the stick 105 and its method of mounting is exactly the same as in the machine 27. Referring to these figures, a bracket 106 is secured to and projects inwardly from the guide 40 and is provided in its upper face with a notch 107 which opens upwardly and forwardly of the bracket 106. A pivotally mounted bracket 108 is mounted on the guide 40 and projects inwardly therefrom and is provided with an upwardly and inwardly opening recess 109 and an inwardly extending handle 110. As best illustrated in Figure 24, the bracket 108 is provided with a downwardly bowed arm 111 which is pivotally connected at 112 to a lug 113 which projects from the outer side of the guide 40. The pivot 112 is provided with a spring 114, as seen in Figure 25 for normally retaining the bracket 108 in its full line position of Figure 24; however the handle 110 can be manually engaged for swinging the bracket 108 to its dotted line position of Figure 24 for releasing the stick 105 from engagement therewith. As best illustrated in Figure 22, the rear end of the stick 105 seats in the notch 107 and a portion thereof, adjacent its forward end, rests in the recess 109. The forward end of the stick 105 is provided with a tapered, spear-shaped point 115, for a purpose which will hereinafter become apparent.

The endless conveyor 58 is driven in a clockwise direction as seen in Figure 1, and as indicated by the arrows 116 by the driving means, previously described. The movement of the endless conveyor is intermittent as will now be described. Assuming that a plate 59 is located above the plate 54 and with the claw member thereof centrally disposed with respect to the notch 55 and in alignment with the push rod 90, as seen in Figure 4, the claw member thus disposed will have its lever end 68 held extended with respect to the plate 59 so that the claws 67 will be opened. As the machine 27 moves forward along a row of growing plants, a stalk from a plant 103 will enter the open jaws 67 and will exert a rearward pressure thereby against the push rod 90, and at the same time, will cause the jaws 67 to close around the plant stalk 103. The rearward movement thus imparted to the push rod 90 will cause the rear end thereof to move the clutch disk 94 into operative engagement with the clutch portion 97, as previously described. This will cause the sprocket wheels 70 and the bevel gear 89 to revolve with the axle 32. The rotation of the bevel gear 89 will rotate shafts 87 and 84 to revolve the knife 102 to cut off the stalk of the plant 103 below the level of the plate 54. The rotation of the sprocket wheel 70 will be imparted to the sprocket wheel 73, shaft 72, shafts 75 and sprocket wheels 79 to move the endless conveyor 58 in a clockwise direction. This movement of the endless conveyor will cause the claws 67, grasping the aforementioned plant 103 to move toward the afore-referred to shallow channel portion 51. The lever 68 will engage the entrance end of the shallow channel portion 51 immediately upon moving out of engagement with the plunger head 91 and will be urged inwardly thereby toward the plate 59 for holding the jaws 67 closed around the plant stalk. When the lever ends 68 move out of engagement with the push rod head 91, the push rod spring 92 will urge the push rod forwardly to thereby cause the oblique end 101 to disengage the clutch 71, in the manner previously described in reference to the detailed description of Figure 15. Upon disengagement of the clutch 71 the parts driven by the sprocket 70 and bevel gear 89 will cease to operate thereby stopping movement of the endless conveyor 58 and the knife 102. During this operation, the endless conveyor 58 will have moved a distance equal to the distance between the centers of any two adjacent conveyor plates 59, to thereby position another set of fingers in front of the plunger rod head 91, so that the operation can be repeated when the claws 67 thereof are engaged by the next plant stalk in the row, along which the machine is operating. The claws 67 engaging the cut plant stalks are held closed during the intermittent movement thereof along the conveyor guide portion 43 and 41. Upon traversing the twisted portion 48 the endless conveyor 58 is turned on its longitudinal axis through an arc of 180 degrees, as seen in Figure 1 to position the plates on the inner side of the conveyor guide 40. This rotation of the individual conveyor plates 59 is provided for by the universal joint connection 60. Almost immediately after passing beyond the twisted portion 48, the plant stalk comes in contact with and is pierced by the pointed end of the stick 105, as clearly illustrated in Figures 20 to 25, and is thereafter moved along the shank of the stick until the lever end 68 of the fingers engaging the plant enter the deep portion of channel 51 at 104. When this occurs, the springs 69 will force the lever ends 68 away from its supporting plate 59 thereby causing the claws 67 to open and disengage the plant stalk. Thereafter and for the remainder of the movement of the conveyor plate 59 around the rear portion 52 and along the side portions 42 and 44 and back to the front portion 45 of the conveyor guide 40, the channel 51 is preferably made deep so that the claws 67 may remain open. However, if desired, the channel portion 51 could be again made shallow a reasonable distance beyond the point 104 and after the plants, engaged by the stick 105 have been passed. In traversing the twisted portion 49 of the conveyor guide 40, the conveyor plates 59 are again rotated through an arc of 180 degrees to position the claws 67 in an outwardly extending position ready to again move into position in front of the push rod 90. In addition to the operator, previously referred to, who steers the machine 27, a second operator works in a position adjacent to the stick 105; his duties include moving the bracket 108 from its full line to its dotted line position of Figure 24, when required, to stack the plants 103, one against the other on the shank of the stick 105, and said operator also removes the stick 105, when filled, and replaces it with another stick. The filled stick 105 may be placed in a vehicle, not shown, drawn behind the machine 27 on may be laid upon the ground at the side of the machine.

In Figures 16 to 26 inclusive, another, slightly modified embodiment of the invention is disclosed and which comprises a machine designated generally 120. The frame, location of the wheels and axles, steering means, endless conveyor driving means, plant cutting means and clutch means of the machine 120 are of the same construction as in the machine 27 and therefore will not be described again.

The machine 120, as seen in Figure 16, includes a conveyor guide, designated generally 121 which is supported at a plurality of points throughout its length by means of laterally projecting brackets 122 on supporting posts 123 which rise from the frame or floor of the machine 120. Conveyor guide 121 is similar in shape to the conveyor guide 40 and is similarly disposed with respect to the machine 120, but differs from the conveyor guide 40 in that the twisted portions are dispensed with and, in lieu thereof, the guide 121 is provided with gaps 124 and 125 located in substantially the same positions as the twisted portions 48 and 49, respectively. Also, as best illustrated in Figures 16A, 16B, 23 and 24 the cross sectional construction of the conveyor guide 121 differs from that of the conveyor guide 40. The conveyor guide 121 supports a stick 105 in the same location that the stick 105 is supported on the conveyor guide 40 and in exactly the same manner, as previously described and as illustrated in Figures 20 to 25. Contiguous with the location of the stick 105, the conveyor guide 121 is provided with an outwardly extending longitudinally disposed channel portion 126 having an open, flared forward end 127 and a closed inwardly curved rear end 128. The remainder of the conveyor guide 121 is composed of an upwardly opening, substantially U-shaped channel member 129 and a downwardly opening, similarly shaped channel member 130, which is disposed directly thereabove and which is vertically spaced therefrom to combine therewith to form laterally opening outer and inner slots 131 and 132, respectively.

The endless conveyor, designated generally 133, which is slidably disposed in the guide 121 is composed of a plurality of elongated plates 134, of the same construction as the plates 59 and which are connected together in the same manner by universal ball and socket joints 135. Each of the plates 134 pivotally support a set of pivotally mounted fingers, designated generally 136, each of which includes three superimposed fingers. Fingers 136 differ from the fingers 64, 65 and 66 in that the intermediate portion of the central finger is disposed in crossed relationship to the upper and lower fingers. The claw or plant engaging portion 137 of each set of fingers 136 are similarly disposed and of substantially the same shape as the claws 67. The opposite lever ends 138 of each set of fingers 136, as best illustrated in Figure 18, are also similarly shaped to the lever end 68 and are provided with springs 139, arranged in the same manner as the spring 69, for urging the lever end 138 away from the conveyor plates 134. However, in view of the crossed relationship of the intermediate and the upper and lower fingers, the springs 139 constantly function to urge the jaws 137 into closed position.

As best seen in Figures 16A and 16B, a spring member, in the form of an elongated leaf or strip 140 is secured to the upper channel member 130 at one end thereof and is located so that its opposite, free end projects into the entrance end of the gap 124 and said free end 141 is twisted and arranged to engage each plate 134 as it enters the gap 124, moving in the direction, as indicated by the arrows 142. Looking in the direction of the arrows 142, the spring portion 141 causes each plate 134 as it enters the gap 124 to be rotated through an arc of substantially 90 degrees in a clockwise direction. The conveyor plates 134, at the time of entering the gap 124, are each conveying a plant 103, the weight of the upper end of which will cause such plate to turn in a further arc of 90 degrees on its swivel 135, so that the plate upon re-entering the channel 121 from the gap 124 will be inverted from the position in which it left the channel 121.

At the opposite side of the machine 120, the conveyor strips 134 as they leave the conveyor guide 121 and enter the gap 125, in the direction as indicated by the arrows 142 in Figure 16A, are turned on their longitudinal axis in a counter-clockwise direction, looking in the direction of the arrows 142, by a deflector member 143. The deflector member 143 is similar in shape to the member 140 and is similarly mounted on the conduit 121 and disposed in the entrance end of the gap 125. However, the deflector 143 is arranged to rotate the plates 134 through an arc slightly in excess of 90 degrees. At the opposite, exit end of the gap 125, a similar deflector 144 is provided. Deflector 144 engages under the strips 134 as they approach the exit end of the gap 125 and rotates them further in a counter-clockwise direction to again position them in a vertical plane for re-entrance into the conduit 121.

From the foregoing it will be readily apparent that the claws 137 project outwardly through the slot 131 during the movement of the conveyor strips 134 from the gap 125 around to the gap 124 and at the same time the lever ends 138 project inwardly through the slot 132 and travel therein. Throughout the cycle of movement of the sets of fingers 136, the claws 137 thereof are held closed by the action of the springs 139 on the lever end 138, except during their movement through the channel portion 126. When the lever ends are in engagement with the channel portion 126, said ends are forced inwardly to thereby open the claws 137 to release a plant, carried by the claws, and which plants have been all ready pierced by and are engaged upon the stick 105 as previously described in reference to the machine 27, and as clearly illustrated in Figures 20 to 25. After the lever end 138 moves out of the exit end 128 of the channel 126, the claws 137 resume their closed position and remain thus until in place above the guard plate 54 and the cutting knife 102. However, in assuming this position, the lever ends 138 are cammed inwardly by engagement with the push rod head 91, sufficiently to open the jaws 137 enough to receive the stalk of a plant 103. The pressure exerted against the push rod head 91 by the fingers 138 when the claws 137 are engaged by a plant stalk which is received therein, will cause the push rod spring 92 to yield allowing the push rod 90 to slide rearwardly and actuate the clutch 71, in the manner heretofore described in reference to the machine 27. The subsequent operation of cutting the engaged plant stalks and moving the conveyor to position the next empty claw 137, in place to receive the next plant, in the same manner and by the same means as previously described in respect to machine 27.

From the foregoing description it will be readily apparent that the conveyor strips 134 will be intermittently moved in the direction of the arrows 142 and upon entering the gap 124 will be turned clockwise 180 degrees, as previously described, so that the plant stalk can be pierced by and engaged on the stick 105. Thereafter the claws are opened by the channel 126 for disengaging the claws therefrom and, after leaving the channel end 128, said claws will resume their normal, closed position. Upon passing through the gap 125, the plates 134 are again rotated 180 degrees to position the claws, preparatory to receiving the next plant stalk, as previously described.

Various other modifications and changes are contemplated and may obviously be resorted to without departing from the spirit and scope of the invention as hereinafter defined by the appended claims.

I claim:

1. A plant harvester comprising a mobile frame for movement through a field of standing plant crops, a driven endless conveyor, guide means supported by the mobile frame and in which the endless conveyor is movably mounted, said guide means extending along both sides and across both ends of the frame, a plurality of claw members carried by the endless conveyor for engaging standing plants to be harvested, and means disposed in said guide means for closing and opening the claw members for causing the claw members to engage and release, respectively, the plants.

2. A plant harvester as in claim 1, a driving means for said endless conveyor mounted on the frame, a clutch for said driving means, and a clutch actuator having a portion disposed adjacent the position at which the claws are opened for receiving the plants, said actuator portion being engaged by each claw as the claw is engaged by a plant for moving the clutch actuator to a position to engage the clutch for intermittently driving the endless conveyor.

3. A plant harvester as in claim 1, a driving means for said endless conveyor mounted on the frame, a clutch for said driving means, a clutch actuator having a portion disposed adjacent the position at which the claws are opened for receiving the plants, said actuator portion being engaged by each claw as the claw is engaged by a plant for moving the clutch actuator to a position to engage the clutch for intermittently driving the endless conveyor, and rotary cutting means driven by said driving means and supported on the frame adjacent the position at which the standing plants are engaged by the open claws for severing the plant stalks below the endless conveyor and while engaged by the claws.

4. A plant harvester as in claim 1, a channel member forming a part of the endless conveyor guide means and having portions for engaging and opening the claws to release the plants therefrom.

5. A plant harvester as in claim 1, said guide means including a channel member having spaced portions opening outwardly of the frame and a portion opening inwardly of the frame and connected to the outwardly opening channel portions by twisted channel portions, said claws projecting from the endless conveyor outwardly through the opening of the channel member and being displaceable by the twisted portions thereof to displace the plants carried thereby from the outer side of the frame to the interior thereof.

6. A plant harvester as in claim 1, said endless conveyor including a plurality of flexible conveyor sections disposed in spaced end-to-end relationship, and universal joints connecting said conveyor sections.

GOLLADAY LA MOTTE.

REFERENCES CITED

The following references are of record in the file of this patent:

UNITED STATES PATENTS

| Number | Name | Date |
|---|---|---|
| 459,621 | Baker | Sept. 15, 1891 |
| 889,226 | Hall | June 2, 1908 |
| 1,055,023 | De Leon | Mar. 4, 1913 |
| 1,134,184 | Cook | Apr. 6, 1915 |
| 1,134,206 | King | Apr. 6, 1915 |